United States Patent [19]

Eisen et al.

[11] Patent Number: 5,936,249
[45] Date of Patent: Aug. 10, 1999

[54] METHOD AND SYSTEM FOR OBTAINING X-RAY SINGLE PHOTON SPECTROSCOPIC DATA USING ROOM-TEMPERATURE SOLID STATE DETECTORS BY MEASURING THE INDUCED ELECTRON CURRENT

[75] Inventors: Yosef Eisen, Rishon Le-Zion; Gideon Engler, Rehovot; Asher Shor, Jerusalem; Eli Pollak, Rehovot, all of Israel

[73] Assignee: State of Israel, Atomic Energy Commission Soreq Research Center, Nahal Soreq, Iceland

[21] Appl. No.: 08/951,510

[22] Filed: Oct. 16, 1997

[30] Foreign Application Priority Data

Oct. 23, 1996 [IL] Israel ......................................... 119478

[51] Int. Cl.$^6$ ..................................................... G01T 1/24
[52] U.S. Cl. ................................ 250/370.06; 250/370.07; 250/370.01; 250/370.04; 250/370.03
[58] Field of Search ......................... 250/370.06, 370.07, 250/370.01, 370.04, 370.03

[56] References Cited

U.S. PATENT DOCUMENTS 5,574,284  11/1996  Farr .................................... 250/370.06
5,627,377  5/1997  Hamilton, Jr. et al. ............ 250/370.13

FOREIGN PATENT DOCUMENTS

A-61-122818  6/1986  Japan .

OTHER PUBLICATIONS

N. Matsushita et al., *Nuclear Instruments and Methods*, "On Improving Ge Detector Energy Resolution and Peak-to-Compton Ratios by Pulse Shape Discrimination", vol. 179 (1981) pp. 119–1240.

N. Matsushita et al., *Nuclear Instruments and Methods*, "The Pulse–Height Correction Technique for Improving γ–Ray Spectra from Coaxial Ge Detectors", vol. 201 (1982) pp. 433–438.

M. Richter and P. Siffert, *Nuclear Instruments and Methods*, "High Resolution Gamma Ray Spectroscopy with CdTe Detector Systems", vol. A 323 (1992) pp. 529–537.

Y. Eisen and Y. Horovitz, *Nuclear Instruments and Methods*, "Correction of Incomplete Charge Collection in CdTe Detectors", vol. A 353 (1994) pp. 60–66.

*Primary Examiner*—Constantine Hannaher
*Assistant Examiner*—Andrew Israel
*Attorney, Agent, or Firm*—Oliff & Berridge, PLC

[57] ABSTRACT

A method and a system for obtaining spectroscopic data of a single photon of a given energy that undergoes an interaction, beginning at a given point in time, with a room-temperature solid state detector of a given thickness and fitted with two electrodes, which detection is held at a given bias by a voltage applied to the electrodes. In the course of the interaction, pairs of electrons and holes are created within the solid state detector which induce charge on the electrodes; the method and system enable for determination of a current induced by the electrons, being a measurable and quite accurate parameter for deducing spectroscopic data. The electron induced current is defined as the charge induced on the electrodes due to the electrons only, divided by the time it takes the electrons to induce this charge. The mentioned time is considered equal to that of a particular portion of a signal of the complete induced charge, and both the time and the charge are determined by the method and the system.

23 Claims, 8 Drawing Sheets

METHOD AND SYSTEM FOR OBTAINING X-RAY SINGLE PHOTON SPECTROSCOPIC DATA USING ROOM-TEMPERATURE SOLID STATE DETECTORS BY MEASURING THE INDUCED ELECTRON CURRENT

FIELD OF THE INVENTION

This invention relates to a method and system for obtaining spectroscopic data of a single x-ray or γ-ray photon detected by a room-temperature solid state detector.

BACKGROUND OF THE INVENTION

At present, the best room-temperature solid-state radiation spectrometers use CdTe, CdZnTe and HgI2 detectors. Other spectrometers, such as PbI2 and GaAs, also exist but are still at a research stage. All of these detectors are prone to errors in energy measurements, mainly due to incomplete charge collection of holes, an effect that falsifies the total recorded energy deposited in the detector. Indeed, the mobility-lifetime product for holes ($\mu_h\tau_h$) of these detectors is very low. Even for CdTe, which is one of the best quality detectors, this product is of the order of $10^{-4}$ cm$^2$/V. Thus, even at electric fields as high as 1000 V/cm, the mean free path of holes is no more than 1 mm or so. It is therefore impractical to use thick detectors and still obtain spectroscopic data at high efficiencies.

Many attempts were made to correct for incomplete charge collection. Most methods use correction functions which take into account the correlation between the rise time of the charge pulse created by a single photon interaction and the total charge collected. For example, N. Matsushita et al in Nucl. Instr. and Meth. Vol 179 (1981) p. 119 and in Nucl Instr and Meth. Vol 201 (1982) p. 433, empirically found such a correlation for Ge detectors and were able to correct the pulse height without any significant loss of efficiency. M. Richter and P. Siffert in Nucl. Instr. and Meth. Vol A 323 (1992) p. 529, used a similar technique and were able to correct empirically the pulse height spectra of several planar CdTe detectors. M. Saito in Patent Application No. 61-122818, Japan, 1986, used an electronic circuit to measure the transit time of electrons, i.e., the position of interaction, to correlate it with the total charge (electrons+holes) and to correct for charge trapping. Y. Eisen and Y. Horovitz in Nucl. Instr. and Meth. Vol A 353 (1994) p. 60, adopted another approach, in applying a theoretical correction function to account for incomplete charge collection in CdTe detectors.

However, in practice, any of the corrections of the type mentioned above for detectors with a high rate of hole trapping is prone to errors. For such detectors an approach alternative to total charge collection is therefore necessary.

It is the object of the present invention to provide a method and system for obtaining the spectroscopic data of a single photon interacting in a room-temperature solid state detector having significant hole trapping in which the errors discussed above are significantly reduced or eliminated.

In accordance with the present invention, the spectroscopic data is obtained by utilizing the electron induced current rather than obtaining it by correlating the risetime of the pulse, or any other measured parameter, with the shaped total charge (electrons and holes) as is done in the above cited references.

SUMMARY OF THE INVENTION

The invention makes use of room-temperature solid state detectors having two electrodes. The detector is held at either a positive or negative bias, that is one electrode is positive relative to the other. This bias creates an electric field E, between the electrodes.

An x-ray or γ-ray photon incident on the detector will interact with the solid state material of the detector creating electron/hole pairs, where the number of pairs created is proportional to the energy deposited by the incident photon. Under the influence of the electric field E the pair will acquire a constant velocity with the electrons moving towards the positive electrode and the holes towards the negative electrode. This gives rise to an induced electric current on the electrodes. The integrated current induced from the moment of the photon interaction until both the electrons and the holes are collected by the electrodes, will be referred to as the "total induced charge".

From the moment the electrons reach the positive electrode the induced current is due to the holes only. Measurement of this "hole induced current" leads to large errors in the computation of the spectroscopic data of the interacting photon due to hole trapping. Therefore, spectroscopic data of a single photon interacting with a room-temperature solid state detector derived from the total induced charge has large errors. However, the current induced by the electrons derived from the induced charge up until the time the electrons reach the positive electrode is a more appropriate measurable parameter for deducing spectroscopic data. This current is referred to in the following description and claims as the "electron induced current".

The electron induced current is by far greater than the hole induced current since the mobility of the electrons is greater than that of holes and usually electron trapping is smaller than hole trapping. The electron induced current, as opposed to the shaped total charge pulse, is independent of the point of interaction in room-temperature solid state detectors.

In accordance with the invention it is proposed, therefore, to derive spectroscopic data of a photon interacting with a room-temperature solid state detector from the value of the electron induced current.

As will be demonstrated in more detail in the following description it is preferable, from signal-to-noise considerations, not to directly measure the electron induced current but rather to measure two parameters from which the electron induced current can be deduced: the electron induced charge and the electron transit time which is measured from the point in time at which the interaction takes place to the point in time at which the electron induced current terminates and the hole induced current still contributes to the slope (i.e., the time rate of change) of the induced charge. The transition from the combined electron plus hole induced current to only the hole induced current is characterized by a significant decrease in the slope of the induced charge. In the following description and claims, a significant decrease is taken to be a decrease of at least a factor of ten, since the change in the slope occurs due to the difference between the mobilities of the electrons and the holes, which is at least a factor of ten greater for electrons than for holes in the detectors under consideration, and also due to the faster trapping of the holes as compared with that of electrons.

In accordance with the present invention there is provided a method for obtaining spectroscopic data of a single photon of a given energy that undergoes an interaction, beginning at a given point in time, with a room-temperature solid state detector of a given thickness and fitted with two electrodes, which detection is held at a given bias by a voltage applied to the electrodes; said interaction creating pairs of electrons and holes within the solid state detector which induce charge on said electrodes, the method comprising the steps of:

taking sequential measurements in time of said induced charge whereby induced charge signal samples are obtained;

obtaining a slope signal by deriving time rate of change values of said induced charge signal samples at given points in time;

identifying a point in time at which a significant decrease in said slope signal occurs;

deriving an electron transit time value from the point in time at which a significant decrease in said slope occurs and the point in time at which the interaction begins;

determining an electron induced charge value from the induced charge signal samples at the point in time at which a significant decrease in said slope signal occurs as compared to the induced charge signal samples at the point in time at which the interaction begins;

deriving an electron induced current value from the electron induced charge value and the electron transit time value; and converting into single photon spectroscopic data said electron induced current value.

The method permits operating solid state detectors at low applied voltages, at which electron velocity is still high and electron trapping is small whereas hole velocity is very low and hole trapping is large. This is particularly true for detectors with low leakage current, such as CdZnTe. A low applied voltage results in better noise performance and low power consumption and thus makes it feasible to work with low power electronics such as miniaturized hybrid or integrated circuits.

If desired, said applied voltage is low.

For applications involving relatively high energies, for example the 356 keV line of Ba-133 or the 511 keV line of Na-22, more accurate spectroscopic results are obtained when using the electron induced current as compared to that obtained from the total induced charge. The photopeak efficiency, which is very low when using the total induced charge measurements at these energies, close to the maximum when measuring the electron induced current. This feature enables the use of relatively thick detectors (greater than 5 mm) which are required for obtaining spectroscopic data of high energy photons with high efficiencies. Moreover, at higher energies there is an improvement of the signal-to-noise ratio, which makes the electron induced current measurement more attractive.

If desired, the thickness of the room-temperature solid state detector is greater than 5 millimeters.

The spectroscopic data can be obtained by measuring the electron induced current by irradiating the detector from any direction, i.e., parallel or perpendicular to the electric field direction.

Solid state detectors for which the electron induced charge is a linear function of transit time will be termed linear detectors, others will be termed nonlinear detectors. The deviation from linearity may arise from possible non-linearity of the electric field and from possible slight trapping of electrons. For nonlinear detectors it has been found that the electron induced charge can be represented by a polynomial function of time. In a preferred embodiment of the invention the electron induced charge is a linear function of time. When detectors are nonlinear it is preferable to "linearize" the time dependence of the electron induced charge rather than use complex analysis for determining the corresponding electron induced current. The simplest approach is to use a linearizing projection function.

If required, the electron induced charge, measured before the point in time at which a significant decrease in said slope signal occurs, is multiplied by a linearizing projection function.

In accordance with one embodiment of the method, said sequential measurements of the induced charge are performed digitally by sequentially sampling the induced charge.

Typically, said slope signal is obtained by performing a statistical best fit on said induced charge signal samples.

If desired, said statistical best fit is a least $\chi^2$ fit.

If desired, two parameters are derived from the statistical best fit, the electron induced charge and an electron transit time.

In accordance with another embodiment of the method, said sequential measurements and said point in time at which a significant decrease in said slope signal occurs are stored in a microprocessor. By using a predetermined calibration the electron induced current can then be derived from this data.

Also in accordance with the present invention there is provided a system for obtaining spectroscopic data of a single photon of a given energy that undergoes an interaction, beginning at a given point in time, with a room-temperature solid state detector of a given thickness held at a given bias by an applied voltage, said interaction creating pairs of electrons and holes within the solid state detector which induce charge on said electrodes, the system comprising:

measuring means for taking sequential measurements of said induced charge whereby induced charge signal samples are obtained;

slope determination means for determining a slope signal of said induced charge signal samples at given points in time;

first processor means for identifying a point in time at which a significant decrease in said slope signal occurs;

means for deriving an electron transit time value from the point in time at which a significant decrease in said slope occurs and the point in time at which the interaction begins;

means for determining an electron induced charge value from the induced charge signal samples at the point in time at which a significant decrease in said slope signal occurs as compared to the induced charge signal samples at the point in time at which the interaction begins;

second processor means for deriving an electron induced current value from the electron induced charge value and the electron transit time value; and third processor means for converting into single photon spectroscopic data said from electron induced current value.

In accordance with one embodiment, the system includes digital components whereby said sequential measurements of said induced charge signal samples are performed digitally by sequentially sampling the induced charge signal by means of an analog to digital converter thereby yielding induced charge signal samples.

In accordance with this embodiment, the system further includes memory means for storing said induced charge signal samples.

If desired, said first, second and third processor means can be combined in one processor means.

Generally, said one processor means is a microprocessor.

In accordance with another embodiment, the system includes analog components to determine the electron induced charge and the electron transit time.

In accordance with this embodiment, the system is provided with an electronic Zero Time Level Discriminator which identifies a single photon interaction event whereupon the recording of the induced charge signal is initiated.

If desired, said slope determination means comprises a Change of Slope Discriminator.

Further if desired, said measuring means is a Sample/Hold (S/H) circuit for determining the electron induced charge at the point in time at which a significant decrease in said slope signal occurs.

If desired, the electron transit time is determined by a Zero Time Level Discriminator and a Change in Slope Discriminator.

Further if desired, the electron induced current is derived from a Pulse Divider Analyzer (PDA), which divides the electron induced charge determined at the point in time at which a significant decrease in said slope signal occurs by the electron transit time.

Still further if desired, said PDA performs linearization of the electron induced charge simultaneously with division by the electron transit time, in order to deduce the electron induced current.

Generally, said system, whether it includes analog or digital components, further includes a charge sensitive preamplifier which converts said induced charge signal samples into a voltage pulse.

Quite generally, said system, whether it includes analog or digital components, further includes a voltage amplifier for amplifying said voltage pulse.

If desired, said photon is a gamma-ray photon.

Further if desired, said photon is an x-ray photon.

BRIEF DESCRIPTION OF THE DRAWINGS

For a better understanding the invention will now be described by way of example only with reference to the accompanying drawings, in which.

DETAILED DESCRIPTION OF SPECIFIC EMBODIMENTS

The description of the invention will be preceded by a brief description of the dynamics of the interaction of a single photon with a typical solid state detector in order to establish the terminology Assuming that the electric field across the detector is constant and that detrapping can be neglected, the current flow I(t,x), due to the electron/hole pairs created by a photon interaction can be presented, according to the Ramo theorem, as follows:

$$I(t,x)=Qe/D[v_e(t)n_e(t,x)+v_h(t)n_h(t,x)] \quad (1)$$

where Q is the number of pairs created, e is the electron charge, D is the detector thickness between electrodes, $v_e(t)$ and $v_h(t)$ are the velocities of electron and holes respectively, $n_e(t,x)$ and $n_h(t,x)$ are the momentary electron and hole concentrations created by the interaction and x is the point of interaction (the distance x can be measured from any suitable origin, e.g. from one of the electrodes). For a constant electric field E, the velocities of electrons and holes are constant and depend on the mobilities ($\mu_e$ and $\mu_h$, respectively) as follows:

$$v_e(t)=\mu_e E \text{ and } v_h(t)=\mu_h E \quad (2)$$

where, for CdTe and CdZnTe, for example, $\mu_e$~1100 cm²/V/sec and $\mu_h$~80 cm²/V/sec.

When electron and hole trapping is negligible, the currents induced by the electrons and holes depend on the initial charge created and on the electric field. From the numbers quoted above for $\mu_e$ and $\mu_h$ it is clear that $\mu_e/\mu_h$>10, i.e., the mobility of electrons is at least a factor of 10 greater than that of holes. Consequently, it can be deduced from Equations 1 and 2 that, for a constant electric field, the current induced by electrons is greater than that induced by holes by at least the same factor, i.e., a factor>10. Furthermore, unless the interaction takes place in the vicinity of the negative electrode, the electrons will reach the positive electrode before the holes reach the negative electrode.

In reality, imperfect stoichiometry and other defects in room-temperature semiconductor detectors, cause trapping of both electrons and holes, with hole trapping being far greater compared to electron trapping. Therefore, whereas the measurement of the total induced charge leads to large errors in the computation of the spectroscopic data of the interacting photon due to hole trapping, these errors can be reduced by measuring the electron induced current.

Furthermore, whereas $Q_e$ ($Q_h$) depends on the point of interaction in the detector, the electron (hole) induced current $i_e$ ($i_h$) is independent of this point. Therefore, when trapping prevails it is preferable to relate to the induced current and not to the induced charge.

Figure 1:
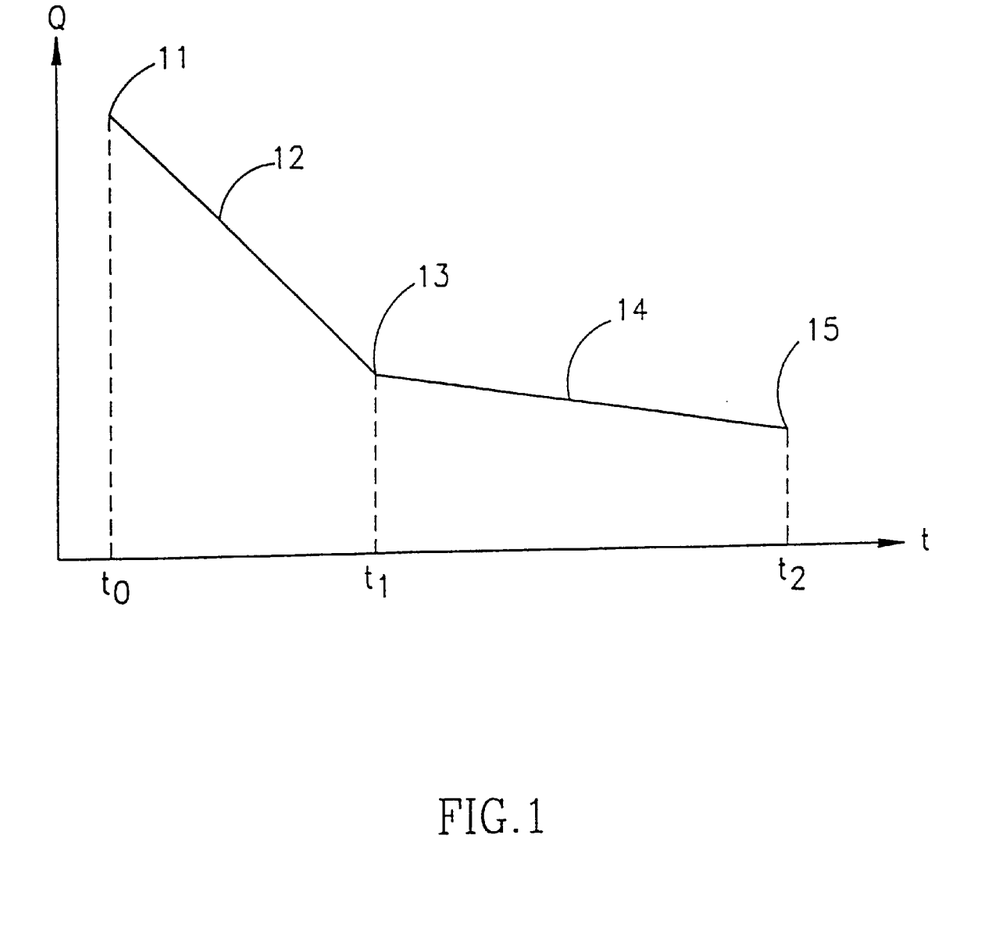
FIG. 1 shows the induced charge as a function of time for a typical photon interaction.

Attention is first drawn to FIG. 1 showing the induced charge as a function of time for a typical photon interaction. The photon interaction begins at 11 at time $t_0$. The combined electron plus hole induced charge 12 has a steep slope (i.e., time rate of change of the induced charge) and exists from time $t_0$ until time $t_1$ at 13 when all the electrons reach the positive electrode. The hole induced charge 14 continues from time $t_1$ until time $t_2$ at 15 when all the holes that have not been trapped reach the negative electrode. In the time between $t_0$ and $t_1$ the electron induced current is by far greater than the hole induced current.

Figure 2:
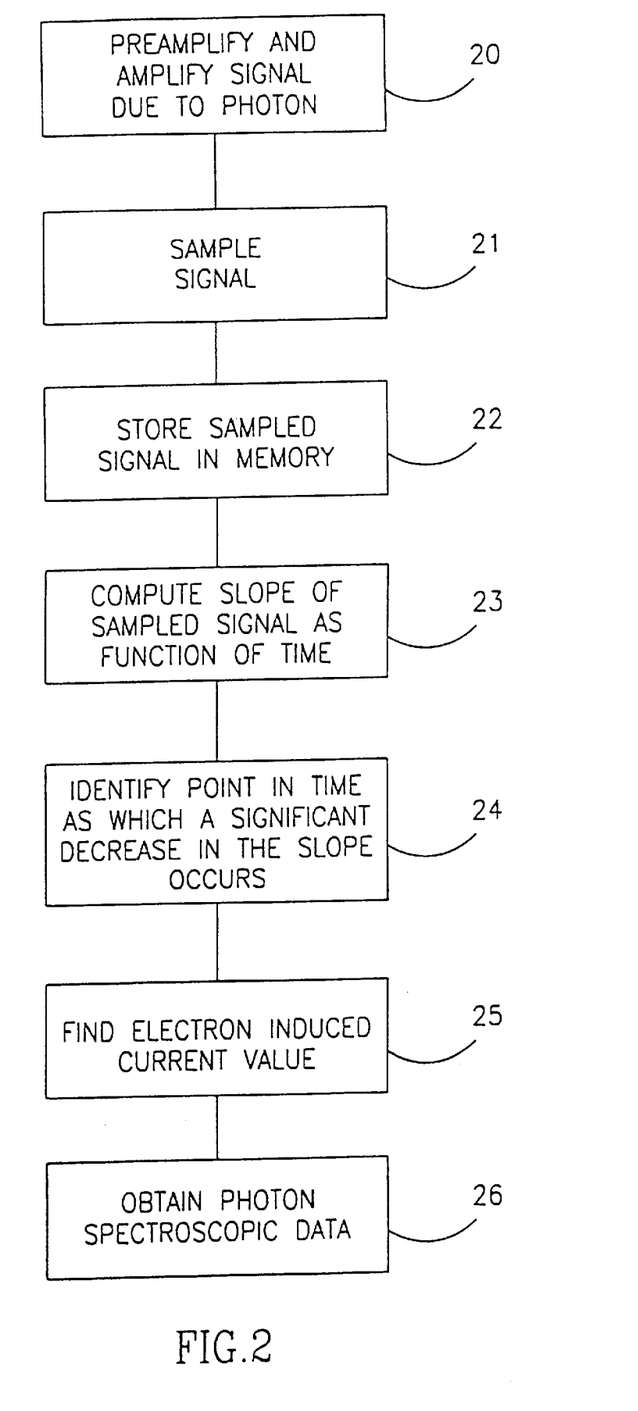
FIG. 2 shows a flow chart of the principal steps according to the digital implementation of the method of the invention.

Attention is now drawn to FIG. 2 showing a flow chart of the principal steps according to the digital implementation of the method of the invention. At step 20 the induced charge signal on the detector's electrode is measured and amplified. At step 21 the induced charge signal is digitally sampled and thereafter stored in a memory device at step 22. It should be noted that at step 20 the amplification is not essential, and that the signal could just as well be sampled directly from the detector's electrodes without amplification.

At step 23 the slope (time rate of change) of the induced charge is evaluated. This can be done by performing a statistical best fit on the induced charge signal samples. In particular it can be done by performing a least $\chi^2$ fit on the values of the induced charge signal samples. The particular method to be used for evaluating the slope of the induced charge depends on the expected rate of the incident photons on the detector. At step 24 the transition from the electron induced current to the hole induced current is identified by noting a significant decrease in the slope of the induced charge signal samples.

Figure 3:
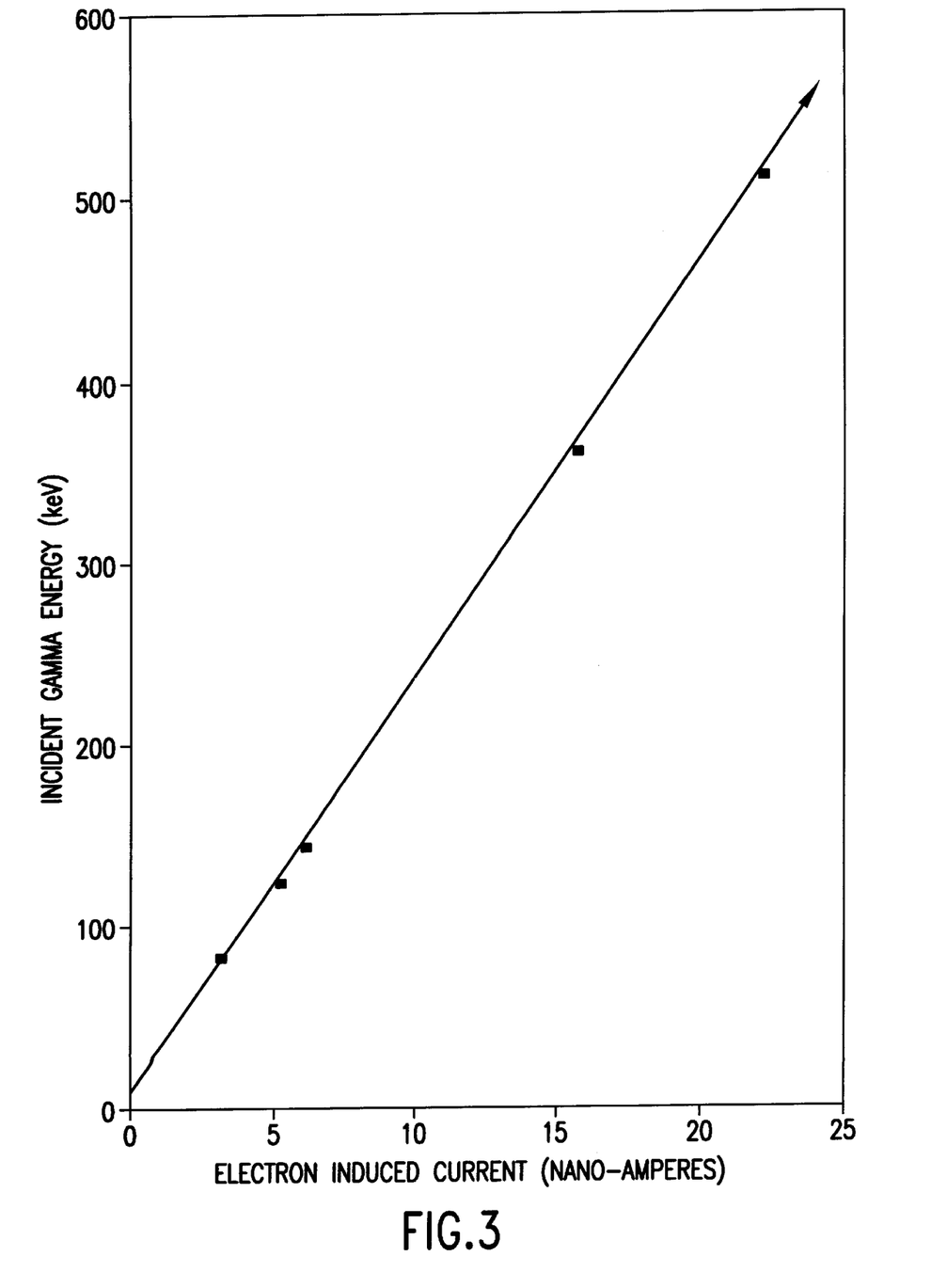
FIG. 3 shows the linearity of the measured interacting photon's energy as a function of the electron induced current.

At step 25 the value of the electron induced current is taken as the slope of the induced charge signal samples prior to the significant decrease in its slope. At step 26 the electron current value is converted into spectroscopic data of the single photon. The conversion is based on a straightforward calibration procedure applied to the detector, an example of which is shown in FIG. 3, showing the electron induced current as a function of the interacting photon's energy. The graph in FIG. 3 is obtained by irradiating the detector with photons of five known energies. The method of the invention was applied for each photon and the resulting value of the electron induced current was found for each energy value. A best fit straight line for the five points can be used as a calibration curve for determining the energy of photons whose energy prior to the measurement is not known.

Figure 4:
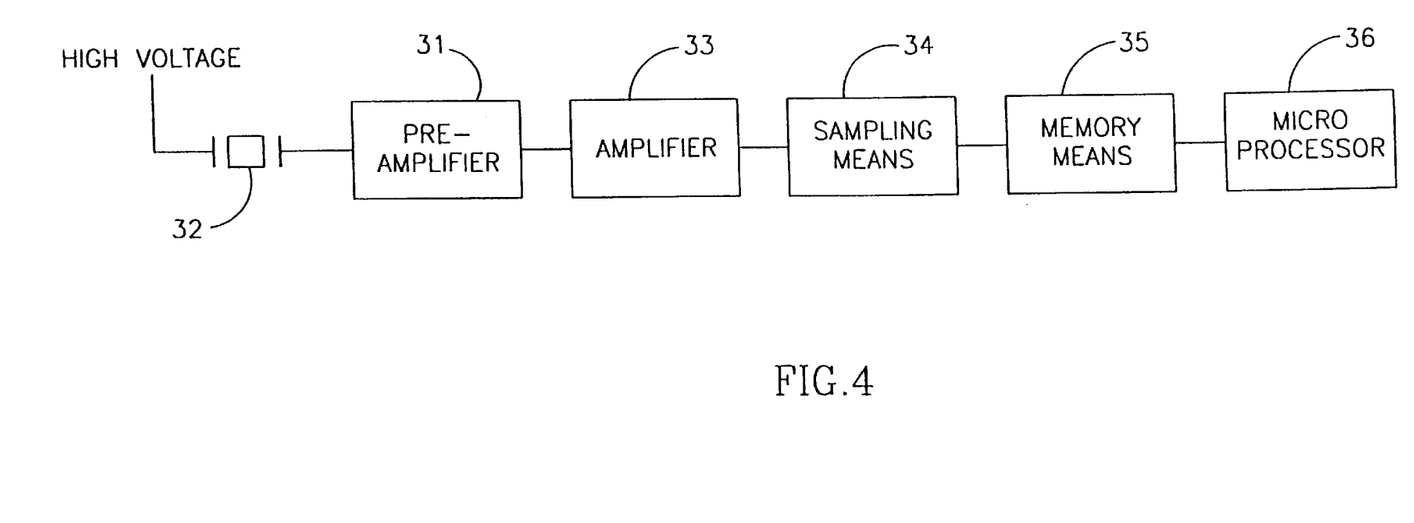
FIG. 4 shows a block diagram of an embodiment of a system for measuring the electron induced current by digital means.

Attention is now drawn to FIG. 4 showing a block diagram of an embodiment of a system for measuring the electron induced current by digital means. Preamplifier 31 is connected to one electrode of detector 32, whereas the other electrode is connected to a high voltage source. Preamplifier 31 is charge sensitive and converts the charge induced on the electrodes of detector 32 into a voltage signal proportional to the induced charge. Amplifier 33 amplifies the voltage signal received from the preamplifier and filters off high frequency noise. It should be noted that this particular preamplifier-amplifier combination is only one possibility. At very high photon energies the amplification means may be omitted.

Sampling means 34 (e.g., a flash analog to digital converter) samples the output of amplifier 33 and the sampled data in successive time buckets(induced charge signal samples) are stored in memory means 35. Microprocessor 36 processes the saved sampled data as follows: it computes their slope, identifies a significant decrease in the slope, finds the electron induced current and finally converts it into spectroscopic data of the interacting photon (e.g. the photon's energy). It should be noted that the term microprocessor in connection with the present invention encompasses any computing and processing means.

Figure 5:
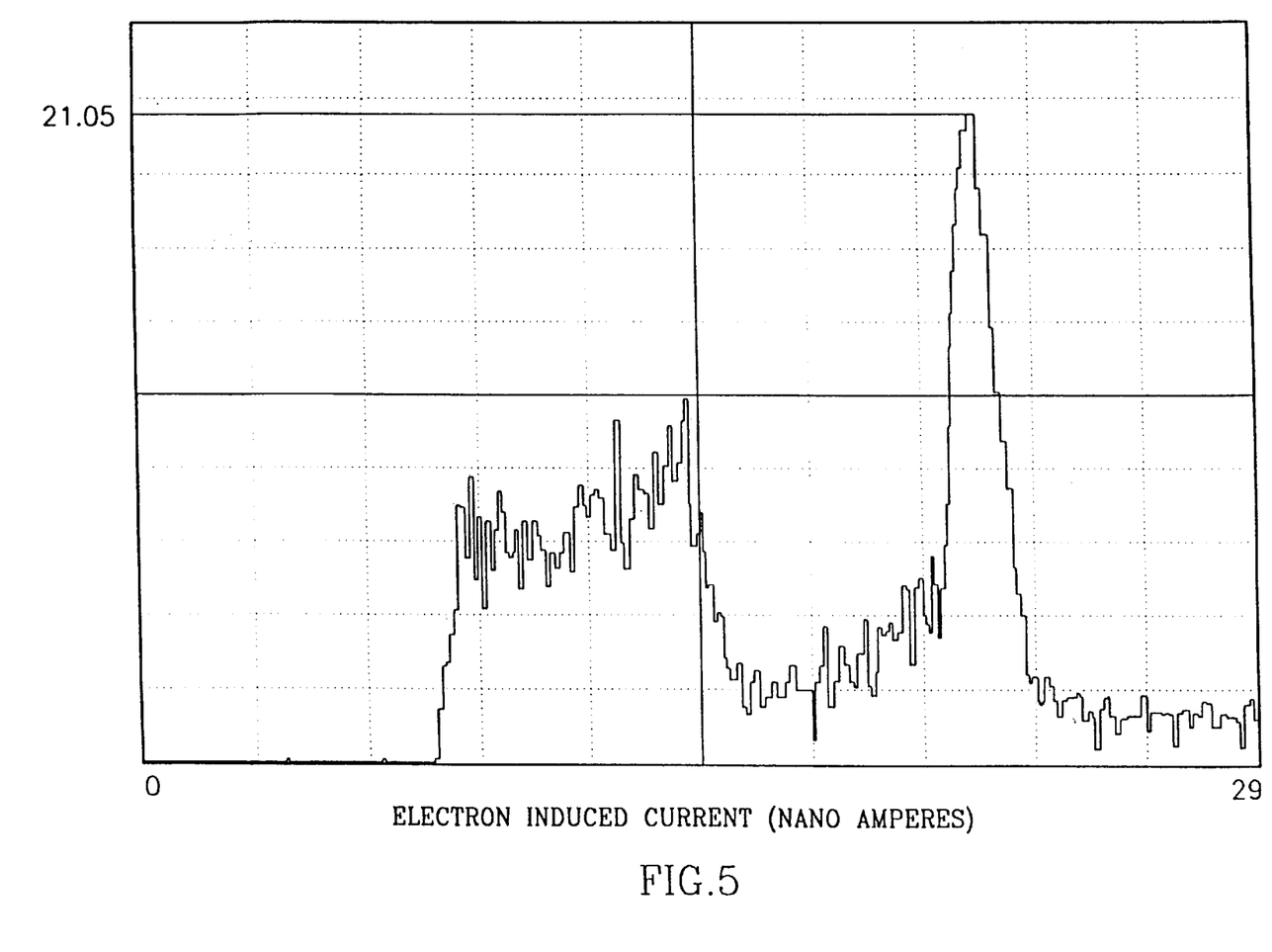
FIG. 5 shows the spectrum of Na-22 (511 keV) obtained with a CdZnTe detector held at a bias of 100 Volts, utilizing the system described in FIGS. 2 to 4.

Attention is now drawn to FIG. 5 showing a spectrum of Na-22 (511 keV) obtained by applying the above described sampling technique using a flash analog to digital converter. A 3 mm thick CdZnTe detector was used, held at a bias of 100 Volts.

Figure 6:
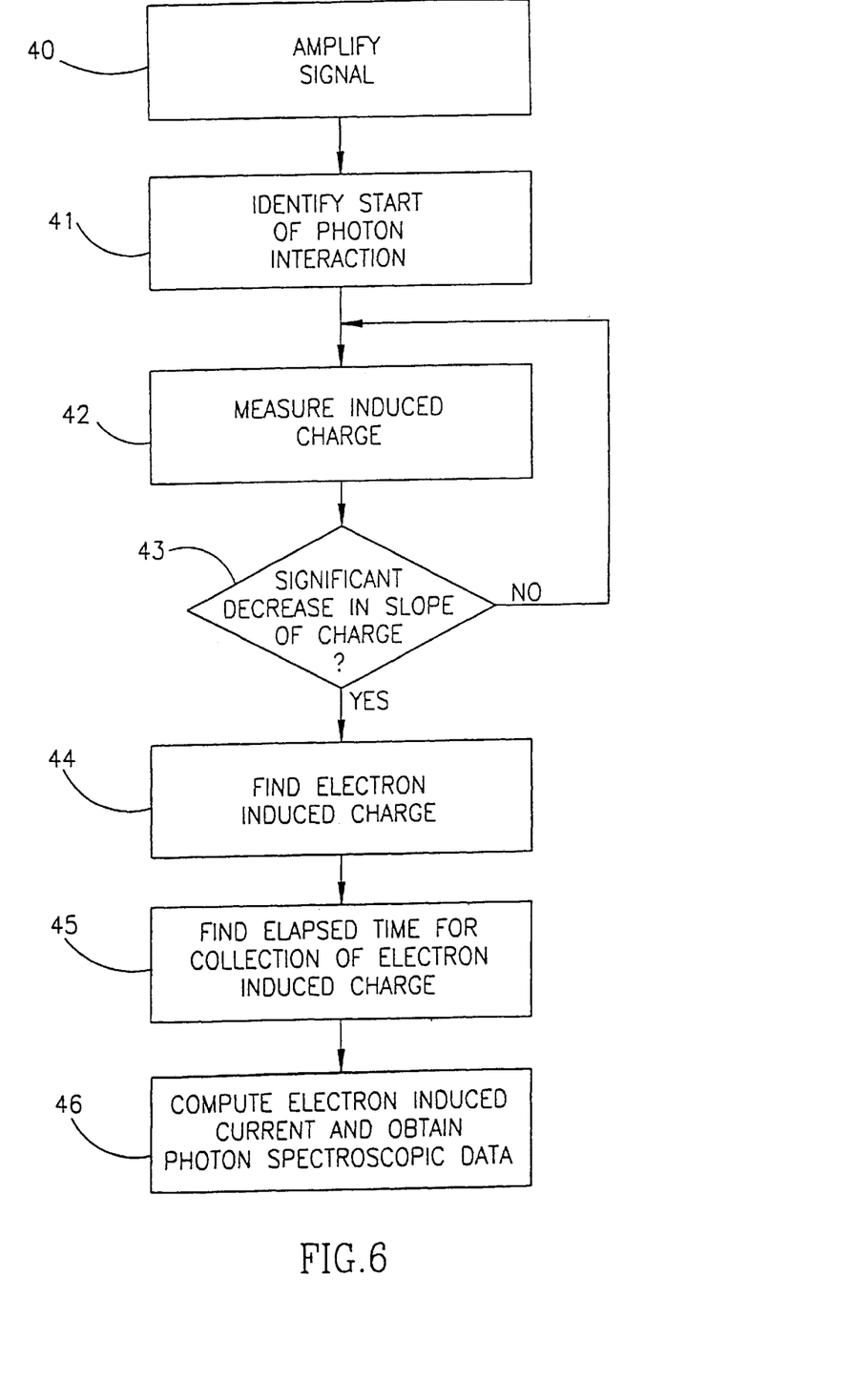
FIG. 6 shows a flow chart of the principal steps according to the analog method of the invention for measuring the induced charge.

Attention is now drawn to FIG. 6 showing a flow chart of the principal steps according to the analog method of the invention for measuring the induced electron current. At step 40 the induced charge collected on the detector's electrodes is measured, amplified and transferred to a Zero Time Level Discriminator (ZTLD) 41 which identifies the start of a photon interaction with the detector. It should be noted that the step of amplification is not essential step of the present invention and thus can be omitted, or alternatively carried out as a part of any of steps 41, 42 or 43.

At step 42 the electron induced charge is measured by a Sample/Hold (S/H) circuit. At step 43 the slope of the induced electron charge is computed and continuously monitored for a significant decrease in its value. This function is performed by a Change of Slope Discriminator. When a significant decrease in the slope is observed the measurement of the induced charge is terminated. Control is transferred at step 44 to the Sample/Hold circuit which outputs a signal proportional to the electron induced charge. This is done by taking the difference between the induced charge it measured when a significant decrease in the slope is observed and the induced charge measured when the start of the interaction is identified at step 41.

At step 45 a Time to Amplitude Converter outputs the time elapsed between the time at which a significant decrease in the slope is observed and the time at which the start of the interaction is identified (i.e., the time taken for the electron induced charge to be collected by the detector's electrodes). This is also known as the electron transit time.

Finally at step 46 the electron induced current is calculated and converted into single photon spectroscopic data. The electron induced current is calculated by dividing the result of step 44 (electron induced charge) by the output of step 45 (the electron transit time). The conversion of the electron induced current into single photon spectroscopic data is as described with reference to FIG. 3. A correction can also be made at step 46 for nonlinear detectors.

Figure 7:
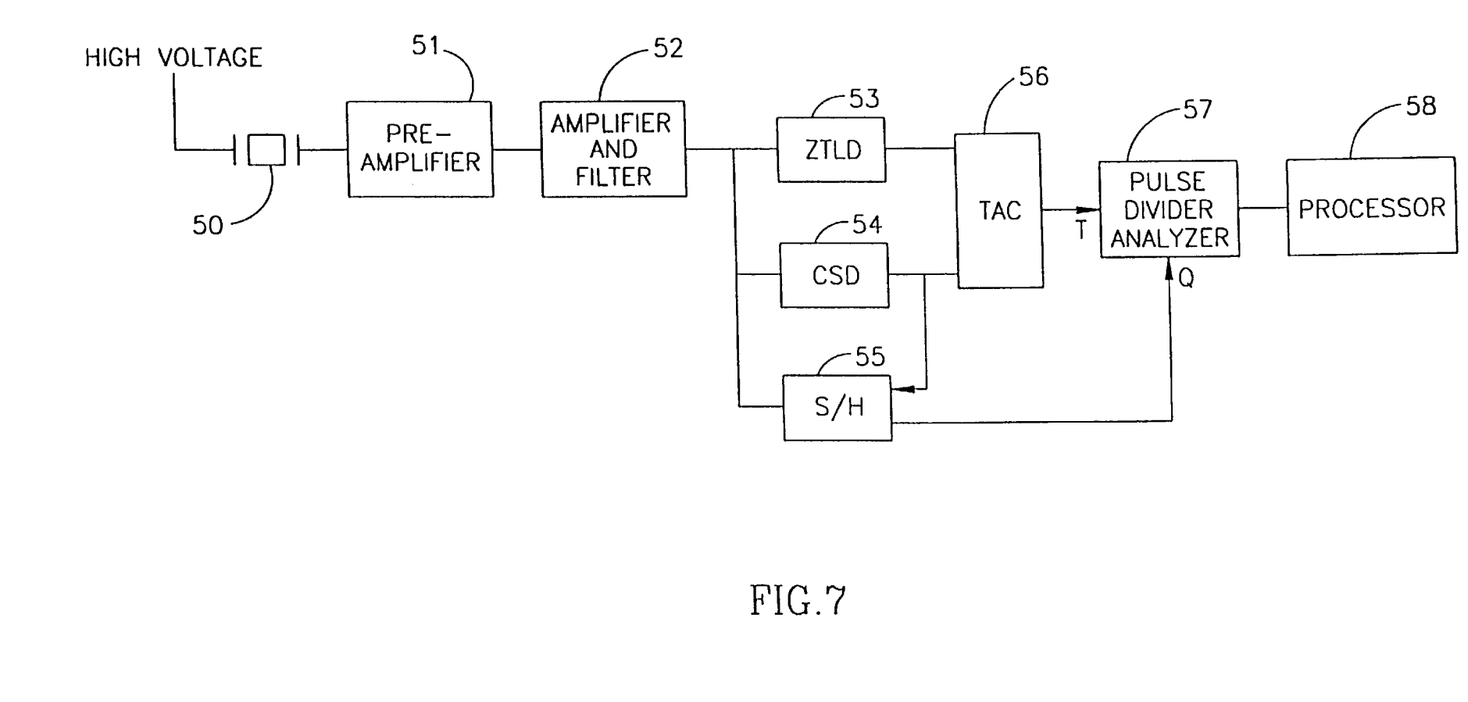
FIG. 7 shows a block diagram of an embodiment of a system for measuring the electron induced current by analog means.

FIG. 7 shows a block diagram of an embodiment of a system for measuring the electron induced current by analog means. The detector 50 is connected to a pre-amplifier 51 and amplifier 52 which amplifies the induced charge measured on the detector's electrode and filters out the high frequency components. Zero Time Level Discriminator (ZTLD) 53 identifies the occurrence of an interaction of a photon with the detector by detecting an induced charge greater than a predefined threshold level. Change of Slope Discriminator (CSD) 54 identifies the point in time at which a significant decrease in the slope of the induced charge occurs. Sample/Hold circuit 55 determines a signal proportional to the electron induced charge by taking the induced charge at the time when a significant decrease in the slope is observed.

Time to Amplitude Converter (TAC) 56 computes the electron transit time by computing the difference between the time elapsed from the time at which a significant decrease in the slope was observed, as identified by the CSD 54, and the time at which the start of the interaction was identified by the ZTLD 53.

Pulse Divider Analyser 57 divides and, if necessary, also corrects for nonlinear detector signals, the output of the S/H circuit 55 (a signal proportional to the electron induced charge) by the output of the TAC 56 (the electron transit time) to obtain the a signal proportional to the electron induced current. This signal is then transferred to microprocessor 58 which converts the input into single photon spectroscopic data using the calibration shown in FIG. 3.

Alternatively, the output of the S/H circuit 55 and the output of TAC 56, can be separately transferred to the microprocessor to determine the induced current and to provide the necessary correction for nonlinear detectors.

Figure 8:
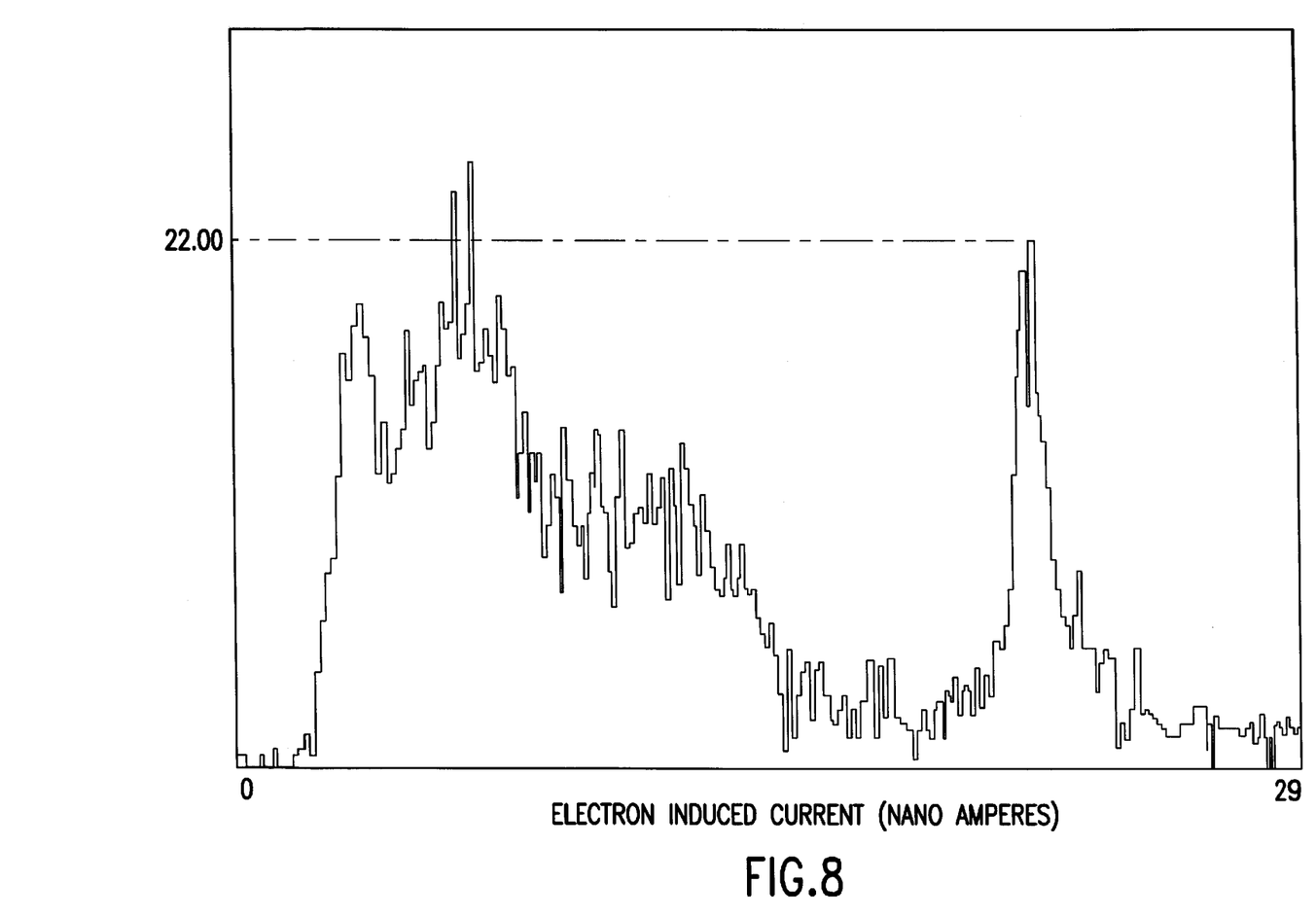
FIG. 8 shows the spectrum of Na-22 (511 KeV) obtained with a CdZnTe detector held at a bias of 100 Volts, utilizing the system described in FIGS. 6 and 7.

Attention is now drawn to FIG. 8 showing a spectrum of Na-22 (511 keV) obtained by applying the above analog technique using the flow chart shown in FIG. 6 and the system shown in FIG. 7. A 3 mm thick CdZnTe detector was used, held at a bias of 100 Volts.

The present invention has been described with a certain degree of particularity but it should be understood that various modifications and alteration may be made without departing from the scope or spirit of the invention as defined by the following claims. It should be noted that although a digital method and apparatus and an analog method and apparatus have been described above separately, the invention encompasses also any combination between both methods and any synthesis between analog and digital apparatus.

We claim:

1. A method for obtaining spectroscopic data of a single photon of a given energy that undergoes an interaction, beginning at a given point in time, with a room-temperature solid state detector of a given thickness and fitted with two electrodes, which detection is held at a given bias by a voltage applied to the electrodes; said interaction creating pairs of electrons and holes within the solid state detector which induce charge on said electrodes, the method comprising the steps of:

taking sequential measurements in time of said induced charge whereby induced charge signal samples are obtained;

obtaining a slope signal by deriving time rate of change values of said induced charge signal samples at given points in time;

identifying a point in time at which a significant decrease in said slope signal samples occurs;

deriving an electron transit time value from the point in time at which a significant decrease in said slope occurs and the point in time at which the interaction begins;

determining an electron induced charge value from the induced charge signal samples at the point in time at which a significant decrease in said slope signal occurs as compared to the induced charge signal samples at the point in time at which the interaction begins;

deriving an electron induced current value from the electron induced charge value and the electron transit time value; and converting into single photon spectroscopic data said electron induced current value.

2. The method according to claim 1, wherein said applied voltage is low.

3. The method according to claim 1, wherein the thickness of the solid state detector is greater than 5 millimeters.

4. The method according to claim 1, wherein the induced charge, measured before the point in time at which a significant decrease in said slope signal samples occurs, is multiplied by a linearizing projection function.

5. The method according to claim 1, wherein said sequential measurements of the induced charge are performed digitally by sequentially sampling the induced charge.

6. The method according to claim 5, wherein said slope signal is obtained by performing a statistical best fit on said induced charge signal samples.

7. The method according to claim 5, wherein a statistical best fit is a least $\chi^2$ fit.

8. The method according to claim 6, wherein the electron induced charge and the electron transit time are derived from said statistical best fit.

9. The method according to claim 1, wherein said photon is a gamma-ray photon.

10. The method according to claim 1, wherein said photon is an x-ray photon.

11. A system for obtaining spectroscopic data of a single photon of a given energy that undergoes an interaction, beginning at a given point in time, with a room-temperature solid state detector of a given thickness fitted with electrodes and held at a given bias by an applied voltage applied to the electrodes, an interaction creating pairs of electrons and holes within the solid state detector which induce charge on said electrodes, the system comprising:

measuring means for taking sequential measurements of said induced charge whereby induced charge signal samples are obtained;

slope determination means for determining a slope signal of said induced charge signal samples at given points in time;

first processor means for identifying a point in time at which a significant decrease in said slope signal samples occurs;

means for deriving an electron transit time value from the point in time at which a significant decrease in said slope occurs and the point in time at which the interaction begins;

means for determining an electron induced charge value from the induced charge signal samples at the point in time at which a significant decrease in said slope signal occurs as compared to the induced charge signal samples at the point in time at which the interaction begins;

second processor means for deriving an electron induced current value from the electron induced charge value and the electron transit time value; and third processor means for converting into single photon spectroscopic data from said electron induced current value.

12. The system according to claim 11, including digital components whereby said sequential measurements of said induced charge signal are performed digitally by sequentially sampling the induced charge signal by means of an analog to digital converter thereby yielding induced charge signal samples.

13. The system according to claim 12, further including memory means for storing said induced charge signal samples.

14. The system according to claim 11, wherein said first, second and third processor means are combined in one processor means.

15. The system according to claim 14, wherein said one processor means is a microprocessor.

16. The system according to claim 11, including analog components to determine the electron induced charge and the electron transit time.

17. The system according to claim 16, further provided with an electronic Zero Time Level Discriminator which identifies a single photon interaction event whereupon a recording of the induced charge signal is initiated.

18. The system according to claim 16, wherein said slope determination means comprises a Change of Slope Discriminator.

19. The system according to claim 16, wherein said measuring means is a Sample/Hold circuit for determining the electron induced charge at the point in time at which a significant decrease in said slope signal occurs.

20. The system according to claim 16, wherein the electron transit time is determined by a Zero Time Level Discriminator and a Change in Slope Discriminator.

21. The system according to claim 16, wherein the electron induced current is derived from a Pulse Divider Analyzer.

22. The system according to claim 11, wherein said photon is a gamma-ray photon.

23. The system according to claim 11, wherein said photon is an x-ray photon.

* * * * *